United States Patent
Drabarek

(10) Patent No.: US 6,188,480 B1
(45) Date of Patent: Feb. 13, 2001

(54) INTERFEROMETRIC MEASUREMENT OF POSITIONS, POSITION CHANGES, AND PHYSICAL QUANTITIES DERIVED THEREFROM

(75) Inventor: Pawel Drabarek, Tiefenbronn (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/319,454

(22) PCT Filed: Nov. 6, 1997

(86) PCT No.: PCT/DE97/02568

§ 371 Date: Sep. 3, 1999

§ 102(e) Date: Sep. 3, 1999

(87) PCT Pub. No.: WO98/25103

PCT Pub. Date: Jun. 11, 1998

(30) Foreign Application Priority Data

Dec. 6, 1996 (DE) ............................................. 196 50 703

(51) Int. Cl.$^7$ ...................................................... G41B 9/02
(52) U.S. Cl. ........................... 356/484; 356/489; 356/485
(58) Field of Search .................................... 356/484, 485, 356/486, 489

(56) References Cited

U.S. PATENT DOCUMENTS 4,765,738   8/1988   Henmi .

FOREIGN PATENT DOCUMENTS

WO 89 12799   12/1989   (WO) .

OTHER PUBLICATIONS

Lachish et al., "Tunable Diode Laser Based Spectroscopic System For Ammonia Detection in Human Respiration", Review of Scientific Instruments, vol. 58, No. 6, Jun. 1987, pp. 923–927.

Pie–Yau Chien et al., "Distance– and Velocity–Detection Interferometer by Using A Frequency Triangular–Modulated Laser Diode", Applied Optics, vol. 34, No. 16, Jun. 1, 1995, pp. 2853–2855.

Roos et al., "Laser Vibrometer Based On Optical–Feedback–Induced Frequency Modulation of A Single–Mode Laser Diode", Applied Optics vol. 35, No. 34, Dec. 1, 1996, pp. 6754–6761.

*Primary Examiner*—Robert Kim
(74) *Attorney, Agent, or Firm*—Kenyon & Kenyon

(57) ABSTRACT

Described is a method of interferometric measurement of positions and position changes, as well as physical quantities derived therefrom, of a part to be tested using heterodyne interferometry, with a laser being modulated to change the frequency of the radiation emitted by it using a time-variable pulsating injection current in order to generate the heterodyne frequency, and one portion of the emitted radiation is routed via an optical bypass, while the other portion is routed without the optical bypass to the part and, from there, to a measuring receiver. Improved evaluation of the measurement results is achieved with smaller dimensions due to the fact that the signal shape of the injection current has a rising edge that is steep compared to its pulse length and a subsequent plateau.

8 Claims, 1 Drawing Sheet

INTERFEROMETRIC MEASUREMENT OF POSITIONS, POSITION CHANGES, AND PHYSICAL QUANTITIES DERIVED THEREFROM

FIELD OF THE INVENTION

The present invention relates to a method of interferometric measurement of positions and position changes, as well as of physical quantities derived therefrom, of a part to be tested, using heterodyne interferometry, with a laser being modulated to change the frequency of the radiation emitted by it using a time-variable pulsating injection current, in order to generate the heterodyne frequency, and portion of the emitted radiation is routed via an optical bypass, while the other portion is routed without the optical bypass to the part and therefrom to a measuring receiver.

BACKGROUND INFORMATION

Such a method is known in conjunction with different optical systems and is described, for example, in European Patent No. 420 897 B1. In order to generate the heterodyne frequency, which is well-suited for the quantitative evaluation, the radiation emitted by the semiconductor laser (laser diode) is modulated using a time-variable injection current. The radiation emitted by the laser is divided into two beams, one of which is routed via an optical bypass and the other is routed without an optical bypass to the part to be tested. The optical bypass is implemented, for example, using deflecting mirrors or a light guide loop. Details of heterodyne interferometric measurement can be found in the aforementioned document.

Other embodiments for heterodyne interferometric measurement of positions, position changes, rotation angles, speeds and other physical quantities derived therefrom are known, with the optical bypass being implementable using a bypass prism. With these methods and measuring devices, positions or path differences, as well as quantities derived therefrom, can be measured with high accuracy, for example, in the nm range. To modulate the laser, the signal of the injection current in these known methods and devices has a sinusoidal, triangular or sawtooth shape with a rising edge that is flat compared with the pulse period, since only such signal shapes are considered suitable for obtaining reliable measurement results. In these methods, the typical length of the optical bypass, for example, for a heterodyne frequency in the MHZ range as customarily used, is on the order of a few decimeters, for example, 40 cm. This relatively long optical bypass runs counter to the desired miniaturization of measurement systems. In addition, by increasing the length of the optical bypass, the contrast of the interference pattern to be evaluated, which is required for the evaluation and should be as high as possible, is diminished, as can be seen from the coherence function, which shows the drop in contrast with increasing length of the optical bypass AL in the form of an exponential function. In this case, evaluation is made difficult by back reflexes of the optical system onto the laser diode, which results in the otherwise single-mode operation of the laser becoming multimode with a peak-shaped coherence function being obtained and the exponential function being the envelope and dropping more steeply than in single-mode operation. In order to avoid back reflexes, an isolator, for example, must be located upstream from the laser, which results in further expenses.

In another measurement method, i.e, a spectroscopic measurement of exhaled air, it is known from Lachish et al., "Tunable diode laser based spectroscopic system for ammonia detection in human respiration," the Review of Scientific Instrument, Vol. 58, No. 6, June 1987, pp. 923–927, that a semiconductor laser can be controlled using a rectangular modulation current to detect a null signal during consecutive light pulses. The semiconductor laser is temperature stabilized in this method.

U.S. Pat. No. 4,765,738 proposes that, in order to measure the frequency response of an optical receiver system, a heterodyne frequency be generated using a laser diode and an optical bypass, with a rectangular modulation being performed, among other things, in order to control a semiconductor laser. Frequencies up to 10 GHz are to be measured with this method. An optical fiber length of 20 km is proposed.

SUMMARY OF THE INVENTION

The object of the present invention is to improve on the method so that the measurement results are improved with a simpler and miniaturized measuring system.

This object is achieved with the signal shape of the injection current which has a steep rising edge compared to its pulse length and a subsequent plateau. Surprisingly, this laser control having steep rising edges and a subsequent plateau, contrary to the usual laser control used for modifying frequencies, results in improved heterodyne interferometric measurement with the optical path diminishable to less than 1 cm. Thus the coherence function of the interference signal contrast can be substantially improved, resulting in a measurement signal that is easier to evaluate. At the same time, the dimensions of the system are considerably reduced and, for example, a considerably smaller bypass prism can be used to miniaturize the measuring system. This is an important advantage, for example, in the case of multidimensional measurements with a plurality of measuring channels, such as those performed with a multi-axis vibrometer. A test model has shown that the dimensions can be reduced several times compared to conventional measurement systems. As an additional advantage, the system can be made insensitive to back reflexes, with the length of the optical bypass being accurately set within narrow tolerances, so that exact evaluations are obtained even with a multimode interference signal in the region of a peak of the coherence function without the need for elaborate measures to suppress back reflexes. Narrow tolerances of the optical bypass can be easily observed with the small overall length of the optical bypass, which is on the order of 1 mm, for example. In order to eliminate the instability of the interference signal at the steep pulse edges during evaluation, the signal converted in a photoelectric transducer of the measuring receiver is advantageously evaluated with a delay during the plateau, only after the edge of the injection current appears.

A simple signal shape is, for example, rectangular pulses of the injection current, which results in extremely steep edges compared to the total pulse length. Relatively steep edges of the signal shape can, however, also be obtained using trapezoidal pulse shapes, pulse shapes that are sinusoidal at the edges, or similar shapes with a plateau.

One advantageous mode of operation is when the injection current pulsates between a minimum value that is less than the threshold current of the laser and a maximum value that is greater than the threshold current. Thus no radiation is emitted during the pauses between pulses. As an alternative, the injection current may pulsate between a minimum value that is greater than the threshold current of the laser and a greater maximum value. In this operating mode, the laser continuously emits radiation whose frequency varies.

In order to eliminate the instability of the interference signal at the steep pulse edges during evaluation, the signal converted in a photoelectric transducer of the measuring receiver is advantageously evaluated with a delay during the plateau, only after the edge of the injection current appears.

The method can be advantageously used so that a plurality of such laser signals are related to form a plurality of measurement channels in time-multiplex mode, with the heterodyne signals of the different measurement channels being generated in non-overlapping time windows. The different channels can be easily evaluated separately using multiplex mode in the evaluation circuit. For simple design and simple evaluation, the laser control signals are advantageously delivered by a common control circuit, and laser diodes, each assigned to one measuring channel, are provided, and a photoelectric transducer that is common to the measurement channels is provided, from which the signals are received in the time multiplex mode and are evaluated separately for each measurement channel in a downstream evaluating circuit.

In one important application the measurement channels are assigned to different dimensions. Thus positions and position changes over time can be easily measured and evaluated as in a multi-axis vibrometer, for example.

DETAILED DESCRIPTION

Figure 1:
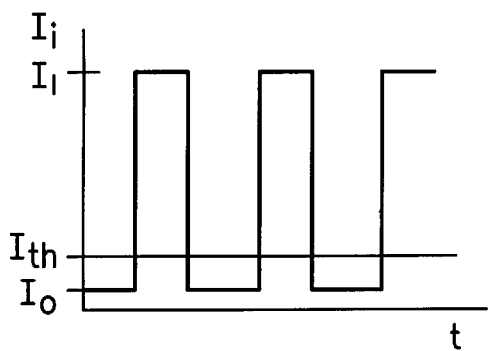
FIG. 1 shows a variation over time of an injection current in a first operation mode.

FIG. 1 shows the variation over time t of the injection current $I_i$. Injection current $I_i$ has a rectangular signal shape, i.e., a particularly steep rising edge and a subsequent plateau for each pulse. The maximum of injection current $I_i$ is $I_i$ that is greater than threshold current $I_{th}$ of a laser diode, while the minimum injection current $I_0$ is less than threshold current $I_{th}$. With this injection current $I_i$ modulated in a rectangular shape, a frequency shift is obtained that is surprisingly well-suited for generating the heterodyne frequency, with a shorter optical bypass, on the order of millimeters, being sufficient for forming the phase shift between a first and a second partial beam emitted by the laser, which is required for generating the heterodyne frequency.

For the design of the overall measurement system for the heterodyne method using the frequency modulated laser and the optical bypass, reference is made to the aforementioned European Patent No. 420 897 B1 and other related art for such measuring systems; optical bypasses in the form of bypass prisms are also known. In these known measurement systems used in the heterodyne method, laser modulation according to the present invention can be used and thus the length of the optical bypass can be substantially shortened, so that not only a substantially more compact design, but also improved measurement evaluation, can be achieved.

Figure 2:
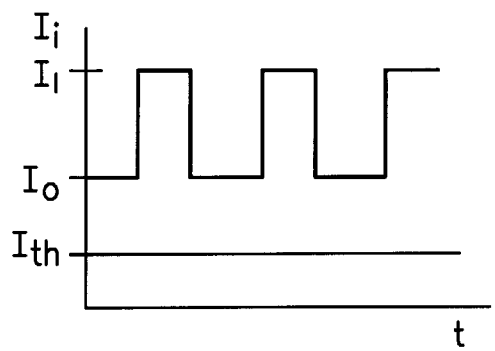
FIG. 2 shows another variation over time of the injection current in a first operating mode.

FIG. 2 also shows an injection current $I_i$ modulated in a rectangular shape; contrary to FIG. 1, the minimum injection current $I_0$, however, is greater than threshold current $I_{th}$, so that radiation is emitted by the laser even during the pulse pauses, which, however, is frequency-shifted with respect to the radiation emitted during the rectangular pulse.

Figure 3:
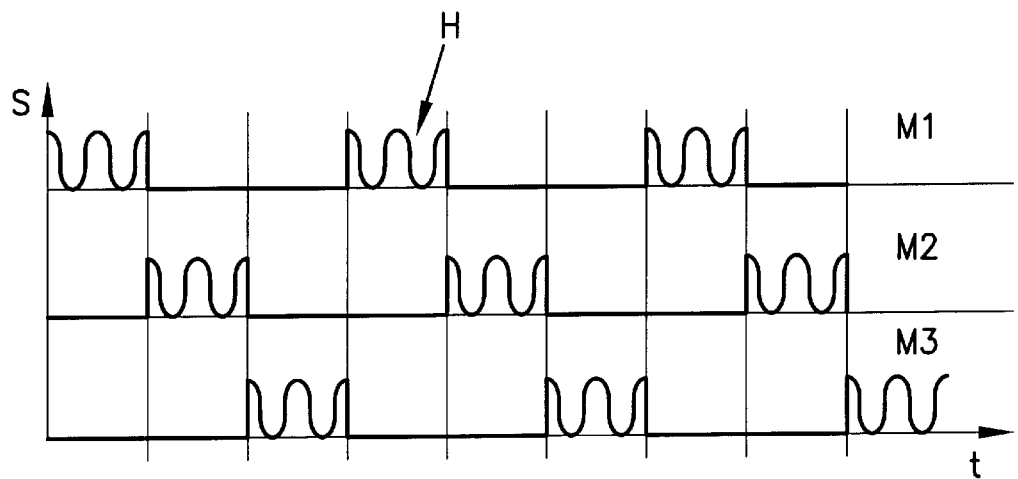
FIG. 3 shows a time-multiplex heterodyne method.
Figure 4:
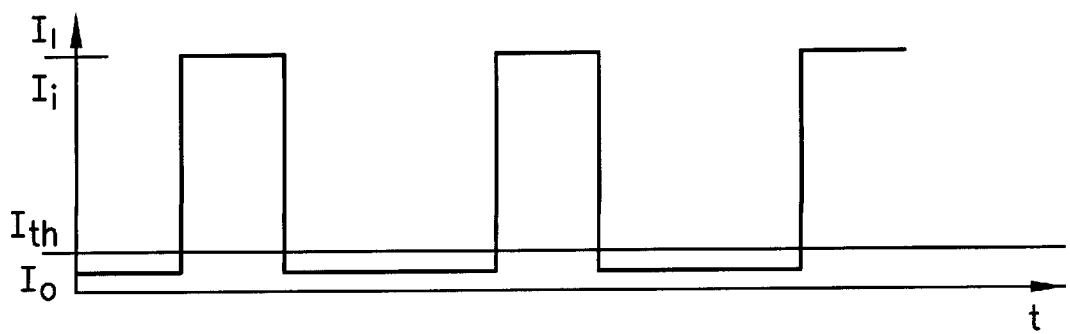
FIG. 4 shows a signal shape of the injection current of a measurement channel in the time-multiplex heterodyne method according to Figure 3.

FIG. 3 shows the variation of heterodyne signals H over time, in, for example, three measuring channels assigned to three different measuring dimensions M1, M2, M3 in a time-multiplex heterodyne method. Heterodyne signals H appear in separate time windows and can be unambiguously assigned to measurement directions M1, M2, M3 during evaluation due to these separate time windows. For example, the durations of the measuring time windows can be on the order of $\mu s$. FIG. 4 shows, for example, modulated injection current $I_i$ for the second measurement dimension M2. Heterodyne signal H for second measurement dimension or second measurement direction M2 is therefore formed during the time of the rectangular pulse. The rectangular shape of injection current $I_i$ is obtained according to the first operating mode shown in FIG. 1, with the minimum injection current $I_0$ being less than threshold current $I_{th}$ in order to prevent radiation for this measurement direction M2 being emitted during the pauses, so that the signal can be unambiguously assigned to measurement direction M2 in a simple manner.

In a measurement system for the time multiplex heterodyne method according to FIGS. 3 and 4, separate laser diodes are assigned to each measurement direction M1, M2, M3 or each measuring channel; these diodes are controlled with the respective injection currents $I_i$ using time-shifted pulses according to the time multiplex mode. Only one photoelectric transducer, for example, a photodiode, must be provided for the measurement receiver; the output signal of the photoelectric transducer is assigned to the different measurement directions M1, M2, M3 according to the time multiplex operating mode.

Such a time multiplex heterodyne method can be advantageously used for a plurality of measurement directions in a multi-axis vibrometer with the dimensions of the device being kept extremely small.

Simultaneous measurement of a plurality of physical quantities can also be performed using the time multiplex heterodyne method in other applications, for example, in a 2-lambda interferometer for shape measurement. Only the appropriate number of measurement channels must be provided.

What is claimed is:

1. A method for interferometrically measuring a position of a part, a position change of the part and a physical quantity of the part, the physical quantity being derived from the position and the position change, the part being tested using a heterodyne interferometry procedure, the method comprising the steps of:

with a time-variable pulsating injection current, modulating a laser to change a frequency of a radiation which is emitted by the part for generating a heterodyne frequency;

routing a first portion of the emitted radiation via an optical bypass to the part;

routing a second portion of the emitted radiation without the optical bypass to the part;

routing the second portion from the part to a measuring receiver, wherein a shape of a signal of the injection current has a rising edge, the edge being steeper as compared to a pulse length and a subsequent plateau of the signal;

converting the signal in a photoelectric transducer of the measuring receiver; and evaluating the converted signal only after a predetermined time period following an occurrence of the edge of the injection current during the subsequent plateau of the signal.

2. The method according to claim 1, wherein the signal has one of a trapezoidal shape, a sinusoidal shape at edges, and a substantially rectangular shape.

3. The method according to claim 1, wherein the injection current pulsates between a minimum value and a maximum value, the minimum value being less than a threshold current of the laser, the maximum value being greater than the threshold current.

4. The method according to claim 1, wherein the injection current pulsates between a minimum value and a maximum value, the minimum value being greater than a threshold value of the laser, the maximum value being greater than the minimum value.

5. The method according claim 1, further comprising the steps of:
   correlating a plurality of signals in a time multiplex mode to form a plurality of measurement channels; and
   generating heterodyne signals of the measurement channels in non-overlapping time windows.

6. The method according to claim 5, further comprising the steps of:
   generating laser control signals for the measurement channels;
   delivering the laser control signals using a common control circuit;
   assigning laser diodes to each of the measurement channels;
   providing the photoelectric transducer which corresponds to the measurement channels;
   tapping off the signals from the photoelectric transducer in accordance with the time multiplex mode; and
   separately evaluating the signals for each of the measurement channels in a downstream evaluation circuit.

7. The method according to claim 5, further comprising the step of:
   assigning the measurement channels to different dimensions.

8. A vibrometer for interferometrically measuring a position of a part, a position change of the part and a physical quantity of the part, the physical quantity being derived from the position and the position change, the part being tested using a heterodyne interferometry procedure, the vibrometer comprising:
   an optical bypass;
   laser diodes;
   a common control circuit;
   a downstream evaluation circuit;
   a measuring receiver including a photoelectric transducer; and
   an arrangement, using a time-variable pulsating injection current, modulating a laser to change a frequency of a radiation which is emitted by the part for generating a heterodyne frequency, the arrangement routing a first portion of the emitted radiation via the optical bypass to the part, the arrangement routing a second portion of the emitted radiation without the optical bypass to the part, the arrangement routing the second portion from the part to the measuring receiver,
   wherein a shape of a signal of the injection current has a rising edge, the edge being steeper as compared to a pulse length and a subsequent plateau of the signal,
   wherein the photoelectric transducer converts the signal, the arrangement evaluating the converted signal only after a predetermined time period following an occurrence of the edge of the injection current during the subsequent plateau of the signal,
   wherein a plurality of signals are correlated in a time multiplex mode to form a plurality of measurement channels, heterodyne signals of the measurement channels being generated in non-overlapping time windows,
   wherein the arrangement generates laser control signals for the measurement channels and delivers the laser control signals using the common control circuit, the laser diodes being assigned to each of the measurement channels, the photoelectric transducer which corresponds to the measurement channels being provided,
   wherein the signals are tapped off from the photoelectric transducer in accordance with the time multiplex mode, the signals being separately evaluated for each of the measurement channels in the downstream evaluation circuit.

* * * * *